United States Patent
Johnstone

(10) Patent No.: US 10,673,662 B2
(45) Date of Patent: Jun. 2, 2020

(54) METHODS AND CIRCUITS FOR GENERATING PARALLEL PSEUDORANDOM BINARY SEQUENCES

(71) Applicant: Keysight Technologies, Inc., Santa Rosa, CA (US)

(72) Inventor: Colin Johnstone, Inverkeithing (GB)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 63 days.

(21) Appl. No.: 15/977,544

(22) Filed: May 11, 2018

(65) Prior Publication Data

US 2019/0349225 A1     Nov. 14, 2019

(51) Int. Cl.
    *G06F 7/58*      (2006.01)
    *H04L 25/03*      (2006.01)
    *H04L 1/24*      (2006.01)

(52) U.S. Cl.
    CPC ........ *H04L 25/03872* (2013.01); *G06F 7/584* (2013.01); *H04L 1/244* (2013.01); *G06F 2207/582* (2013.01)

(58) Field of Classification Search
None
See application file for complete search history.

(56) References Cited

U.S. PATENT DOCUMENTS

| | | | | |
|---|---|---|---|---|
| 4,959,832 A * | 9/1990 | Bardell, Jr. | ............. | G06F 7/584 708/252 |
| 5,446,683 A * | 8/1995 | Mullen | ............ | G01R 31/31813 708/256 |
| 6,636,549 B1 * | 10/2003 | Nakamura | ............. | G06F 7/584 370/479 |
| 8,412,475 B1 * | 4/2013 | Williams, Jr. | ...... | H02J 13/0079 340/3.1 |
| 2002/0016806 A1 * | 2/2002 | Rajski | .................... | G06F 7/584 708/252 |
| 2019/0349225 A1 * | 11/2019 | Johnstone | ......... | H04L 25/03872 |

FOREIGN PATENT DOCUMENTS

EP      0 397 079 A1      11/1990

\* cited by examiner

*Primary Examiner* — David H Malzahn

(57) ABSTRACT

A method for generating M parallel pseudorandom binary sequences (PRBSs), each comprising a $2^n-1$ sequence of pseudorandom bits, includes loading into the circuit an initial M-bit word, the initial M-bit word comprising M sequential bits selected from a pre-determined PRBS-n sequence, wherein n>1 and M>n. The method includes generating, using a plurality of logic gates of the circuit, a next M-bit word using at least n+1 of the M sequential bits of the initial M-bit word. The method includes repeatedly generating, using the logic gates of the circuit, the next M-bit word from a previous M-bit word using the at least n+1 of M sequential bits of the previous M-bit word, resulting in M parallel sequences of the PRBS-n sequence. The method includes transmitting the generated next M-bit words on an M-bit wide parallel bus.

20 Claims, 13 Drawing Sheets

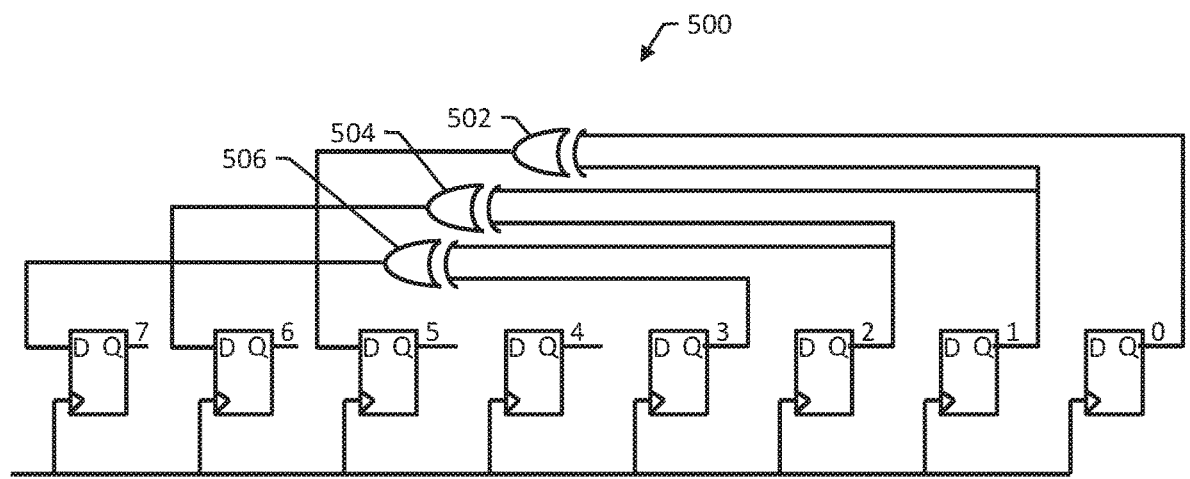
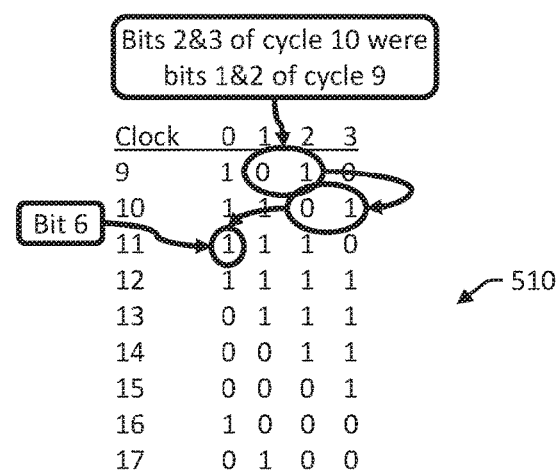
FIG. 5

METHODS AND CIRCUITS FOR GENERATING PARALLEL PSEUDORANDOM BINARY SEQUENCES

TECHNICAL FIELD

The subject matter described herein relates to circuits for generating parallel pseudo random binary sequences (PRBSs).

BACKGROUND

Pseudo Random Binary Sequences (PRBSs) can be generated using methods that result in an almost-perfect random number sequence. A PRBS can be generated in a circuit with a minimal amount of circuitry compared with other methods. A single bit PRBS sequence requires an n bit shift register and one XOR gate to generate a $2^n-1$ sequence of numbers. Every n-bit number is represented once. Normally the only missing number is n zeroes. PRBSs have applications in many areas of digital design, e.g., cryptography, radio communications, telecommunications, mathematical algorithms, noise generators, and testing.

Some conventional large digital circuits run at speeds of around 100-400 MHz. Telecommunications and other high speed interfaces can run at 100 GHz or more. It can be useful to test a high-speed serial interface by feeding a random set of bits through the interface; however, this can be technically challenging due to the mismatch in speed. To overcome this, PRBSs are generated in parallel. Instead of generating one bit per clock cycle, many bits are generated per clock cycle. The resulting circuits, however, may require a substantial amount of routing between logic gates, which can increase the technical difficulty in routing the circuit to meet speed and timing requirements.

Accordingly, there exists a need for circuits for generating PRBSs in parallel with reduced routing requirements.

SUMMARY

A method for generating M parallel pseudorandom binary sequences (PRBSs), each comprising a $2^n-1$ sequence of pseudorandom bits, includes loading into the circuit an initial M-bit word, the initial M-bit word comprising M sequential bits selected from a pre-determined PRBS-n sequence, wherein n>1 and M>n. The method includes generating, using a plurality of logic gates of the circuit, a next M-bit word using at least n+1 of the M sequential bits of the initial M-bit word. The method includes repeatedly generating, using the logic gates of the circuit, the next M-bit word from a previous M-bit word using the at least n+1 of M sequential bits of the previous M-bit word, resulting in M parallel sequences of the PRBS-n sequence. The method includes transmitting the generated next M-bit words on an M-bit wide parallel bus.

In one example, the circuit into which the bits of the M-bit word are fed comprises a sequence of flip flops and a plurality of logic gates, each of which has a plurality of taps that tap outputs of predetermined ones of the flip flops corresponding to bit positions, logically combine the outputs of the predetermined ones of the flip flops, and provide the combined outputs as inputs to other ones of the flip flops, and the taps for at least some of the bit positions are omitted in favor of identified equivalent logical combinations of output values of other bit positions.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 5 shows an example circuit that partially implements the parallel PRBS circuit;

DETAILED DESCRIPTION

It is not uncommon for today's high speed interfaces to require 512, 1024 or more bits to be generated every clock cycle for PRBSs with large values of n, e.g., n=31, 23 or 15. As an example, a 160 Gbit/second interface created using a 512 bit wide parallel PRBS generator needs to generate 512 new PRBS bits at 160,000/512=312.5 MHz or one new word every 3.2 ns. 312.5 Mhz may be near the speed limit for some conventional digital circuits, e.g., field programmable gate arrays (FPGAs).

To create a parallel PRBS, some conventional parallelizing techniques would result in a circuit that can include a series of flip flops, and each flip flop is fed with an XOR of some combination bits from the previous value. In a 512 bit n=31 PRBS some of the XOR gates need up to 15 taps and the average number of taps per XOR gate is around 6. These large numbers of taps produce a spaghetti of routing. The bigger the nest of wires the harder it is to route the FPGA to meet its speed/timing requirements. A substantial portion of the delay in some conventional FPGA circuitry tends to be in the connections rather than the gates.

This specification describes methods for generating a parallel PRBS with fewer taps than some conventional circuits. Every flip flop in a parallel PRBS circuit is generally fed with at least a two tap XOR gate. For example, a 512 bit wide PRBS with n=31 would need 1688 extra taps (over the theoretical best possible case of two per flip-flop) using conventional techniques. In some cases, using the technology described in this specification, all three common PRBSs were reduced to 1024 taps for a 512 bit wide word, and three common PRBSs were reduced to 2048 taps for a 1024 bit wide word. Similar improvements can be seen with other PRBSs.

Figure 1:
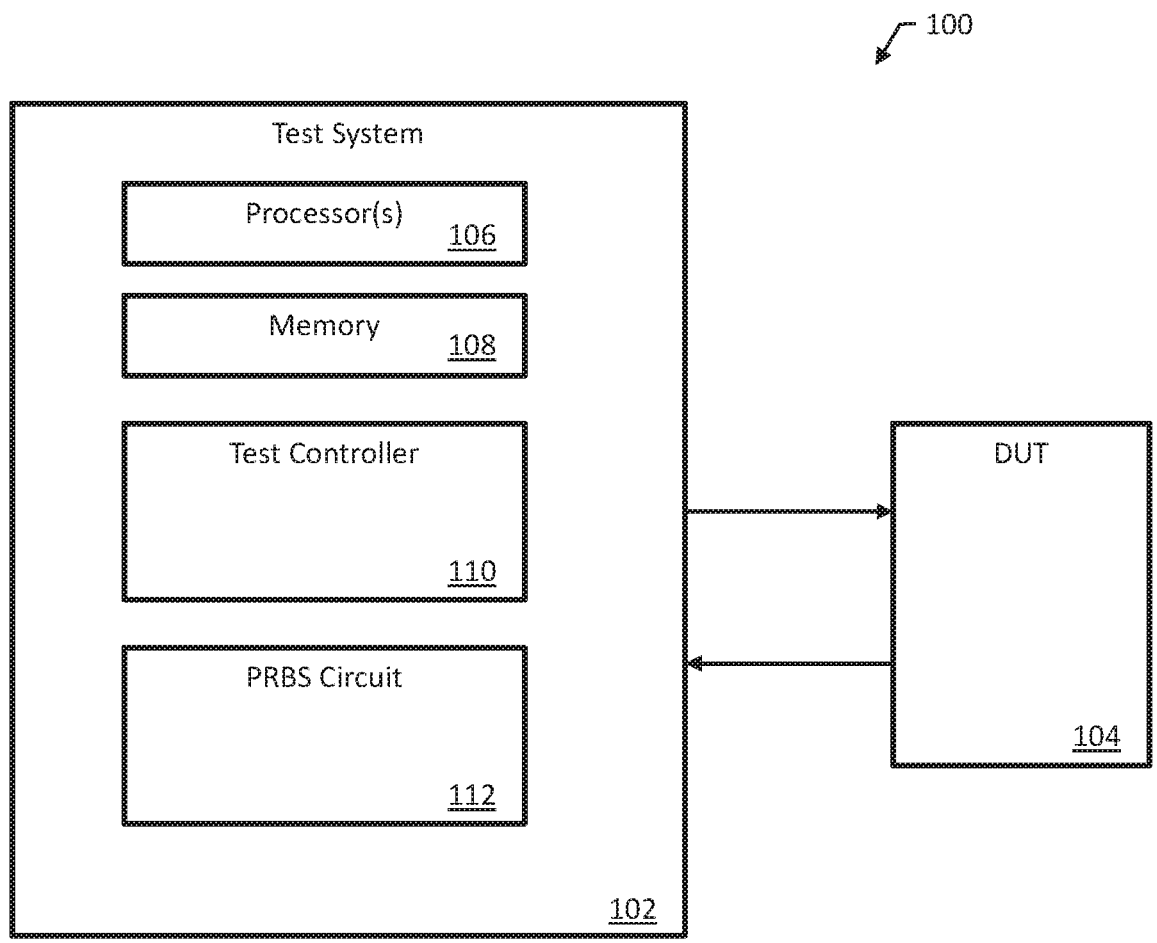
FIG. 1 is a diagram of an example testing environment.

FIG. 1 is a diagram of an example testing environment 100 including a test system 102 and a device under test (DUT) 104. Test system 102 includes at least one processor 106, memory 108, and a test controller 110 implemented on processor 106 and memory 108.

Test system 102 also includes a PRBS circuit 112 configured for generating a parallel PRBS. PRBS circuit 112 can be implemented as an application specific integrated circuit (ASIC) or field programmable gate array (FPGA) including a series of flip flops and XOR gates as described further below with reference to FIGS. 2-10. DUT 104 can be any appropriate device, e.g., a data communications network or components of a data communications device such as a router or network switch.

In operation, test controller 110 executes one or more test cases to test DUT 104. In executing a test case, test controller 110 uses PRBS circuit 112 to transmit generated PRBSs to DUT 104, receive a response from DUT 104, and generate a test result based on the response from DUT 104. For example, test controller 110 can determine a bit error rate by comparing the response from DUT 104 to the generated PRBSs.

Figure 2:
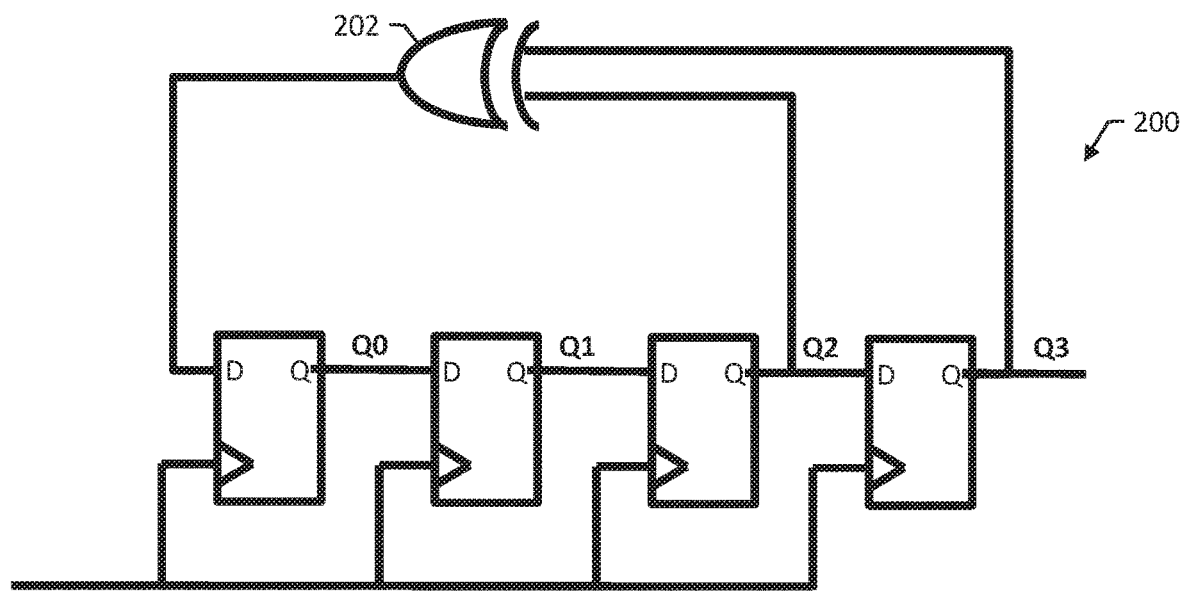
FIG. 2 is a diagram of an example circuit for a serial PRBS generator.

FIG. 2 is a diagram of an example circuit 200 for a serial PRBS generator. Circuit 200 includes a series of D flip flops, labelled Q0, Q1, Q2, and Q3. The flip flops are arranged so that the output of one flip flop in the series is electrically coupled to the input of the next flip flop in the series.

Circuit 200 includes an XOR gate 202 having one input tied to the output of flip flop Q2 and another input tied to the output flip flop Q3. In other words, XOR gate 202 taps Q2 and Q3. The output of XOR gate 202 is tied to the input of flip flop Q0.

In operation, circuit 200 creates a repeating sequence of $2^n-1=15$ values, including every possible value except 0000. The output of any of flip flops Q0-Q3 produces a one bit wide pseudorandom sequence of 1s and 0s. FIG. 2 shows a logic table 250 showing the outputs of the flip flops at each clock cycle of a number of clock cycles of circuit 200.

FIGS. 3-6 illustrate an example of designing a circuit to produce a parallel PRBS. In this example, the circuit produces PRBSs with n=4 and is parallelized, compared to circuit 200 of FIG. 2, to produce 8 parallel bits per clock cycle.

Figure 3:
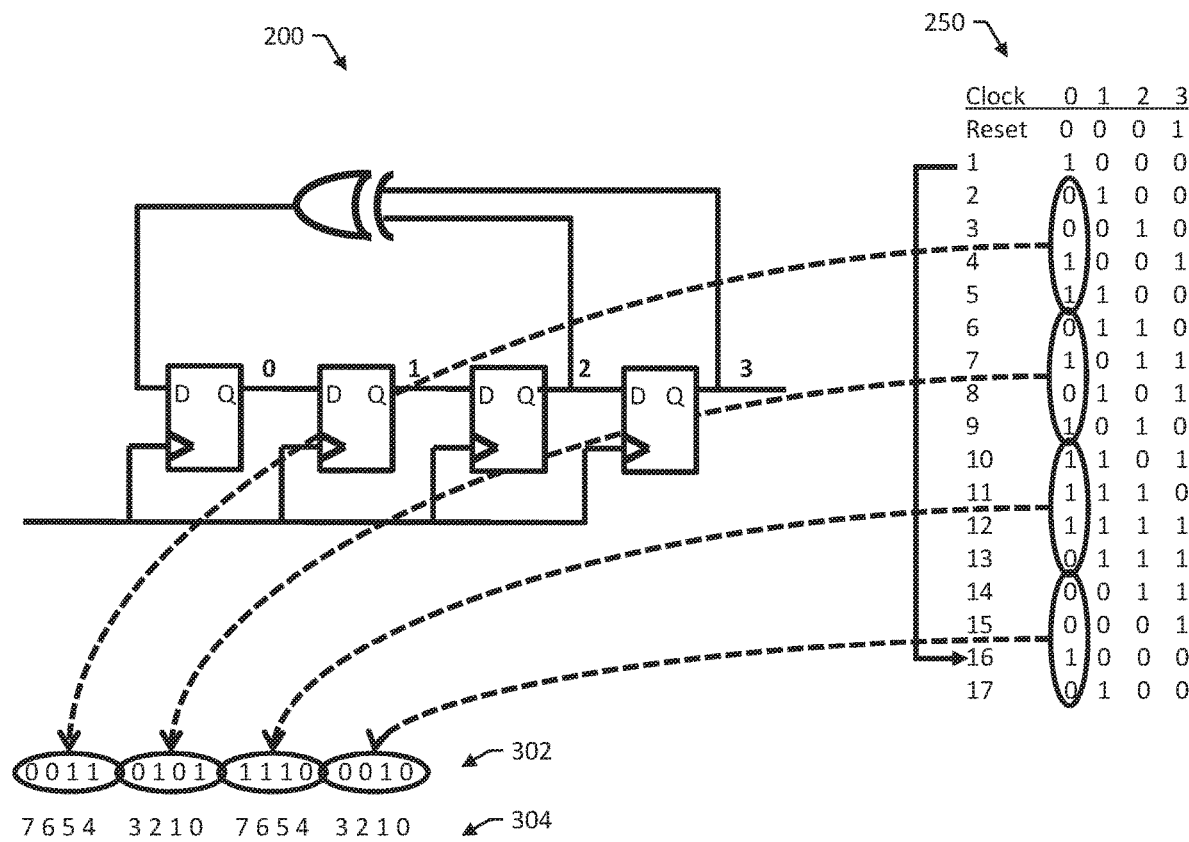
FIG. 3 shows the circuit of FIG. 2 and a mapping from the output bits in the logic table.

FIG. 3 shows the circuit 200 of FIG. 2 (with the flip flops labelled 0, 1, 2, and 3) and a mapping from the output bits in the logic table 250 to 8-bit words 302 suitable for output on an 8-bit wide parallel bus. Since circuit 200 is an n=4 circuit, it is referred to as a PRBS4 circuit.

Conventionally, in a parallel bus the first bit output on a serial bus is the most significant bit followed by the next most significant etc. So an 8 bit bus is output serially in the order 7, 6, 5, 4, 3, 2, 1, 0. In FIG. 3, the bit positions 304 of words 302 are labelled as 7, 6, 5, 4, 3, 2, 1, and 0.

The serial data from column "0" is turned around to a parallel form. 8 bits per entity (or clock cycle). The first 8 bit word corresponds to clock 9 and the second 8 bit word corresponds to clock 17 (8 serial clocks apart). A parallel circuit to produce 8-bit wide PRBS would need to output 00110101 on one clock followed by 11100010 on the next and so on. This will produce a repeating sequence of 15 8-bit words.

Figure 4:
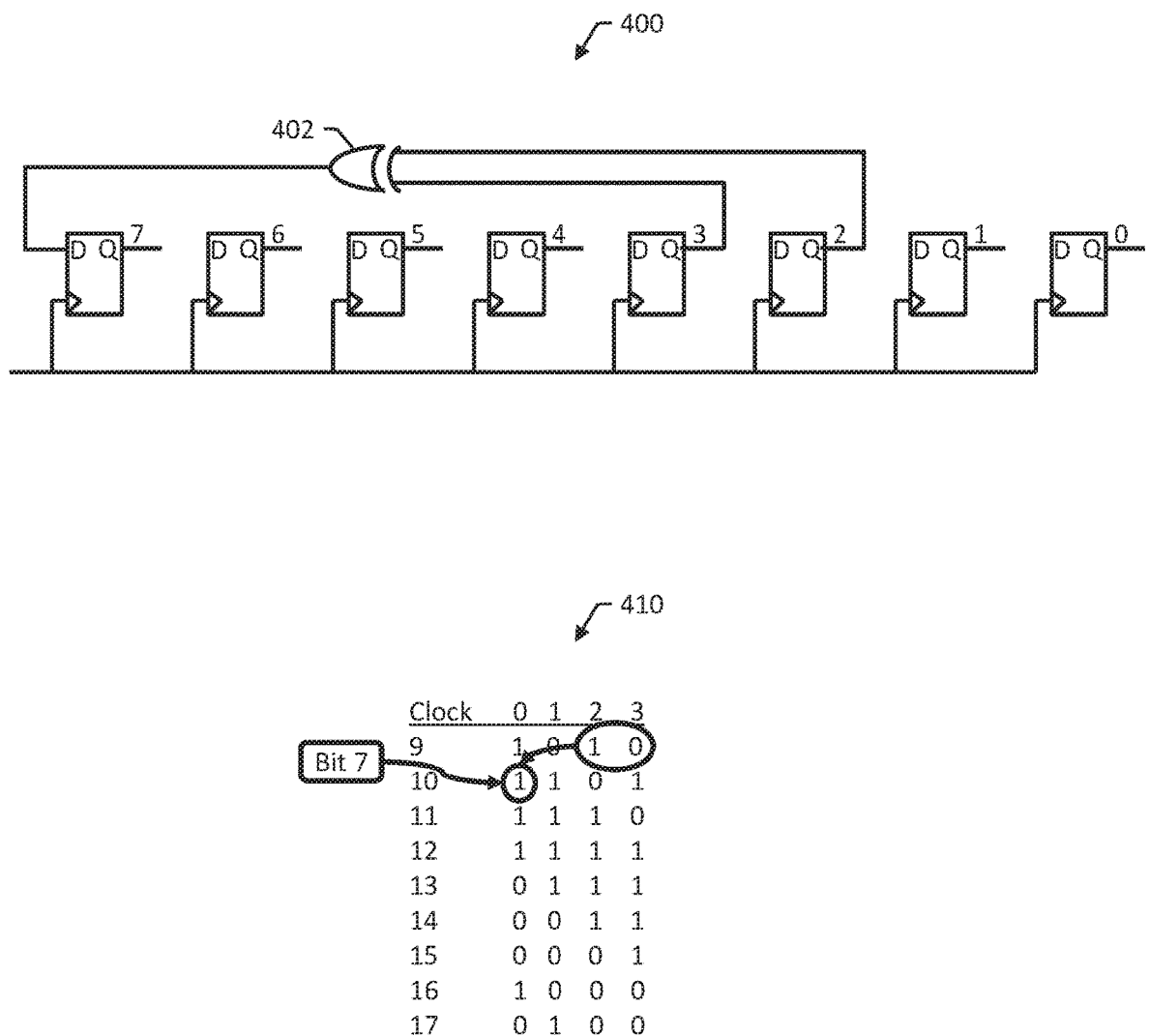
FIG. 4 shows an example circuit that partially implements a parallel PRBS circuit.

FIG. 4 shows an example circuit 400 that partially implements a parallel PRBS circuit. Circuit 400 includes a series of flip flops labelled 7-0. Each of the flip flops will output one of the bits of an 8-bit parallel PRBS word.

Following from FIG. 3, circuit 400 should create 8 values (11100010) in the clock following that where the 4 bits of the PRBS4 were 0101. Looking back at the previous picture of the serial PRBS, the first bit out (0) was formed from bits 3 and 2, as is shown in the logic table 410 of FIG. 4. So we can create the first bit out (bit 7) of the next word by XORing bits 3 and 2 of the previous word, i.e., by including an XOR gate 402 having inputs tied to flip flops 3 and 2 and an output to flip flop 7.

The second and third bits (bit 6 and 5) are formed from XORs of bits 2 and 1 and bits 1 and 0, respectively. This is because in the PRBS4 circuit 300, the second bit out is contained in bits 1 and 2 at clock 9 and becomes the bits that would form the next XOR term on clock 10. Same holds for bits 0&1 at clock 11. The PRBS4 circuit 200 from FIG. 3 creates 8 bits per clock so data (in the context of an 8-bit wide PRBS4) only exists at clocks 9 and 17.

FIG. 5 shows an example circuit 500 that partially implements the parallel PRBS circuit. Circuit 500 includes XOR gates 502, 504, and 506 implementing the first, second, and third bits (bits 7, 6, and 5) of the parallel circuit as described above. XOR gate 506 taps flip flops 3 and 2 and outputs to flip flop 7, so that bit 7 of a next word is created from bits 3 and 2 of the previous word, as is illustrated by XOR gate 402 of FIG. 4.

XOR gate 504 taps flip flops 2 and 1 and outputs to flip flop 6, i.e., so that bit 6 of a next word is created from bits 2 and 1 of the previous word. XOR gate 502 taps flip flops 1 and 0 and outputs to flip flop 5, so that bit 5 of a next word is created from bits 1 and 0 of the previous word. The logic table 510 of FIG. 5 illustrates the creation of bit 6.

Figure 6:
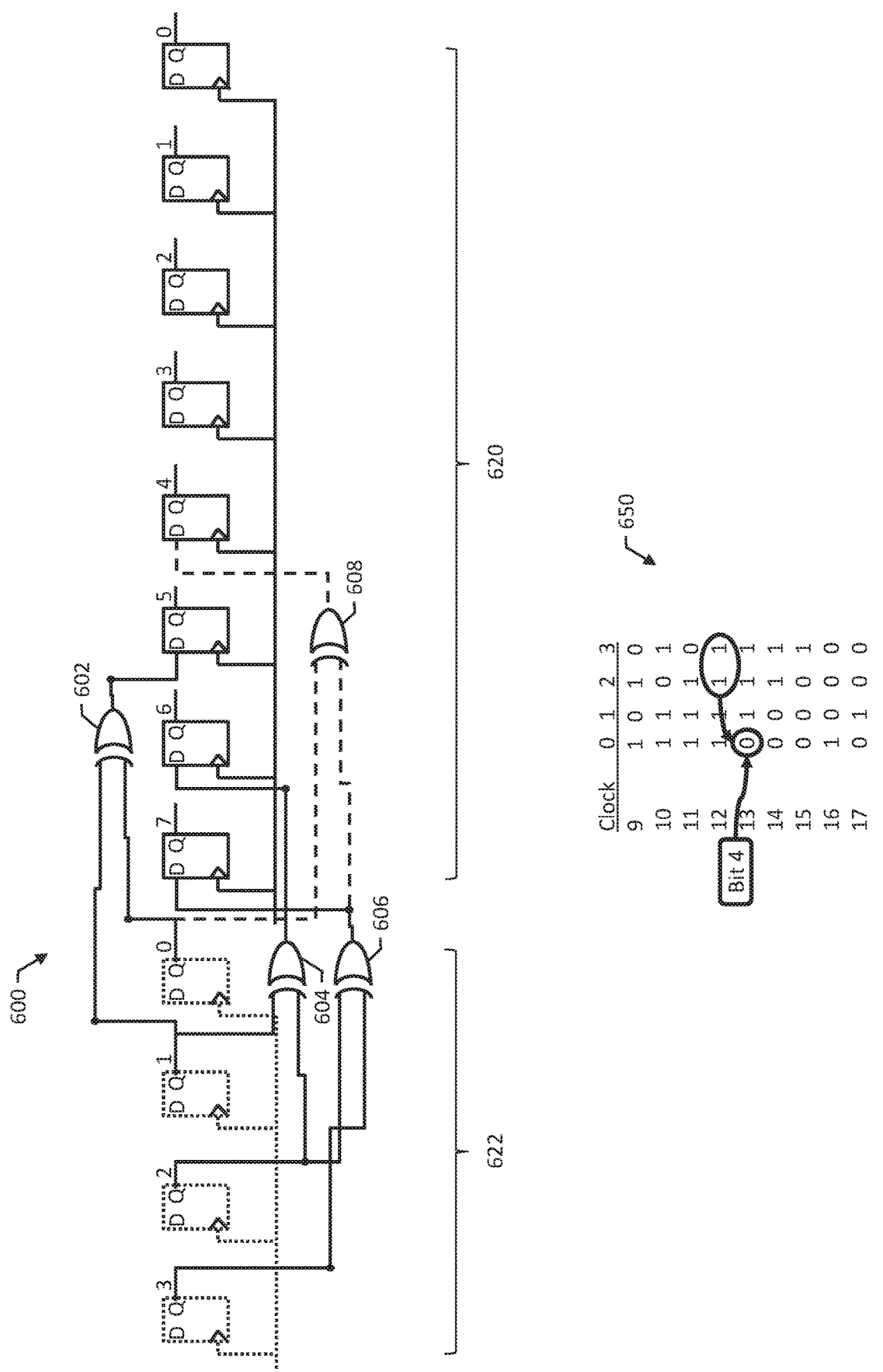
FIG. 6 is a diagram of an example circuit that is shown for illustrative purposes.

FIGS. 3-5 illustrate production of the first three bits of the next parallel word. FIG. 6 illustrates production of bit 4 and the process for producing the other bits.

FIG. 6 is a diagram of an example circuit 600 that is shown for illustrative purposes. The flip flops 7-0 on the right side 620 represent the 8 bits of data present at clock 17 of the PRBS4 circuit 200 of FIG. 3. The flip flops 3-0 on the left side 622 (shown in dotted lines) represent the first four bits of data present at clock 9 of the PRBS4 circuit 200 of FIG. 3.

Referring to the logic table 650 of FIG. 6, bit 4 is an XOR of bits 2 & 3 at clock 12 of the PRBS4 circuit 200. At clock 12, however, does not produce a full word of data for an 8-bit parallel PRBS—only clocks 9 and 17. Stepping back through the clocks in the table 650 it is evident that bit 4 of the new 8 bit word is formed of bit 0 XORed with the bit that came after 0 which, in the context of an 8-bit parallel PRBS, doesn't yet exist.

However, examining the circuit, every bit so far is an XOR of the bit 4-to-the-left and 3-to-the-left. If we continue this on, then bit 4 is an XOR of bits 0 of the original word and bit 7 of the current one. Of course, bit 7 does not exist yet, but the two bits of the previous word that will create bit 7 do exist. Bit 4 can therefore be created using bit 0 (4 to the left) and the bits of the previous word that make up bit 7. It therefore is an XOR of bits 3, 2 and 0.

As shown in FIG. 6, this is represented as an XOR gate 608 that taps both the flip flop for bit 0 on the left side 622 and another XOR gate 606 that taps the flip flops for bits 3 and 2 on the left side 622. FIG. 6 also shows XOR gates 602 and 604 for bits 5 and 6. XOR gate 606 also provides the input for bit 7, i.e., outputs to the flip flop for bit 7 on the right side 620.

The same system can be used for bits 3, 2, 1 and 0. Bit 3 is an XOR of bit 7(4 to the left) and bit 6 (3 to the left). Since 7=3 XOR 2 and 6=2 XOR 1, bit 3 becomes 3 XOR 2 XOR 2 XOR 1.

An exclusive-or gate can be looked upon as a mod-2 counter. If the number of inputs set to 1 is odd then it will output a 1 and if even it will output a 0. If the same input is put onto two inputs of an XOR gate it always produces a zero so the two inputs might as well not be there and can be removed. So, in determining bit 3, 2 XOR'd with itself can be removed leaving 3 XOR 1.

For bit 2 we have 6 XOR 5=2 XOR 1 XOR 1 XOR 0=2 XOR 0. For bit 1 we have 5 XOR 4=1 XOR 0 XOR 3 XOR 2 XOR 0=3 XOR 2 XOR 1. For bit 0 we have 4 XOR 3=3 XOR 2 XOR 0 XOR 3 XOR 1=2 XOR 1 XOR 0.

The necessary taps to produce a parallel PRBS can be drawn using a shorthand method. The flip-flop numbers (i.e., the bit positions) are listed, and underneath each bit position, the taps for that position are logged vertically. For example, if this is all done on squared paper, the taps can be worked out by sliding along a second piece of paper that points to the two taps of the original PRBS.

Figure 7:
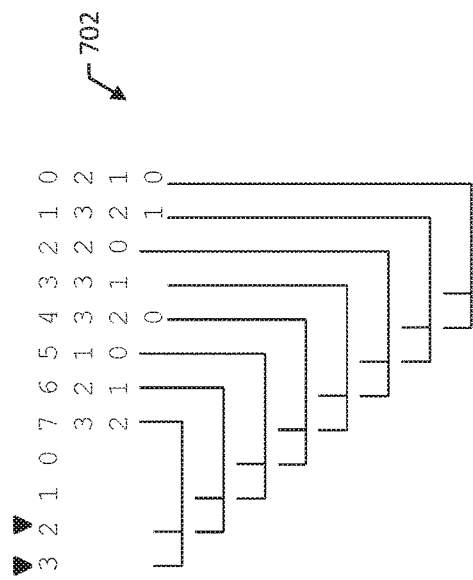
FIG. 7 shows a diagram of the PRBS4 circuit of FIG. 3.

FIG. 7 shows a diagram 702 of the PRBS4 circuit 200 of FIG. 3 drawn using this method. For the sizes of PRBSs that may be implemented in some test systems and other circuits (e.g. PRBS15, PRBS23 and PRBS31), the diagrams may become large.

FIG. 7 also shows a diagram 704 PRBS15 into a 32 bit wide parallel bus. The first few terms have only two input XORs. Bit 17, 3 & 2 have 3 input XOR and bits 1 and 0 have 4 input XORs. What is noticeable is that the wider the parallel bus, the more taps are generally needed. This may be feasible at 32 bits for PRBS15; however, at larger sizes the circuit may be technically challenging to implement.

FIG. 7 shows a diagram 706 of portion of a PRBS23 that is parallelized by 512 bits. The portion shown is a short section between bits 245 and 227. In this portion, each XOR has between 9 and 12 taps. Indeed the average number of taps per XOR gate is 6.08 for PRBS23 and 5.29 for PRBS31, resulting in a total tap count of 3111 for PRBS23 and 2712 for PRBS31. For wide busses this can amount to a lot of wiring and large XOR gates. In an FPGA, a large XOR gate is usually made up of a number of smaller ones leading to more wires and more delay.

When generating a wide parallel PRBS the start conditions of every flip-flop is known. Despite being a random set of numbers they will be in one specific order for a particular PRBS. If the start conditions of every flip-flop can be initialized, then it is possible to generate a PRBS with a smaller circuit.

Figure 8:
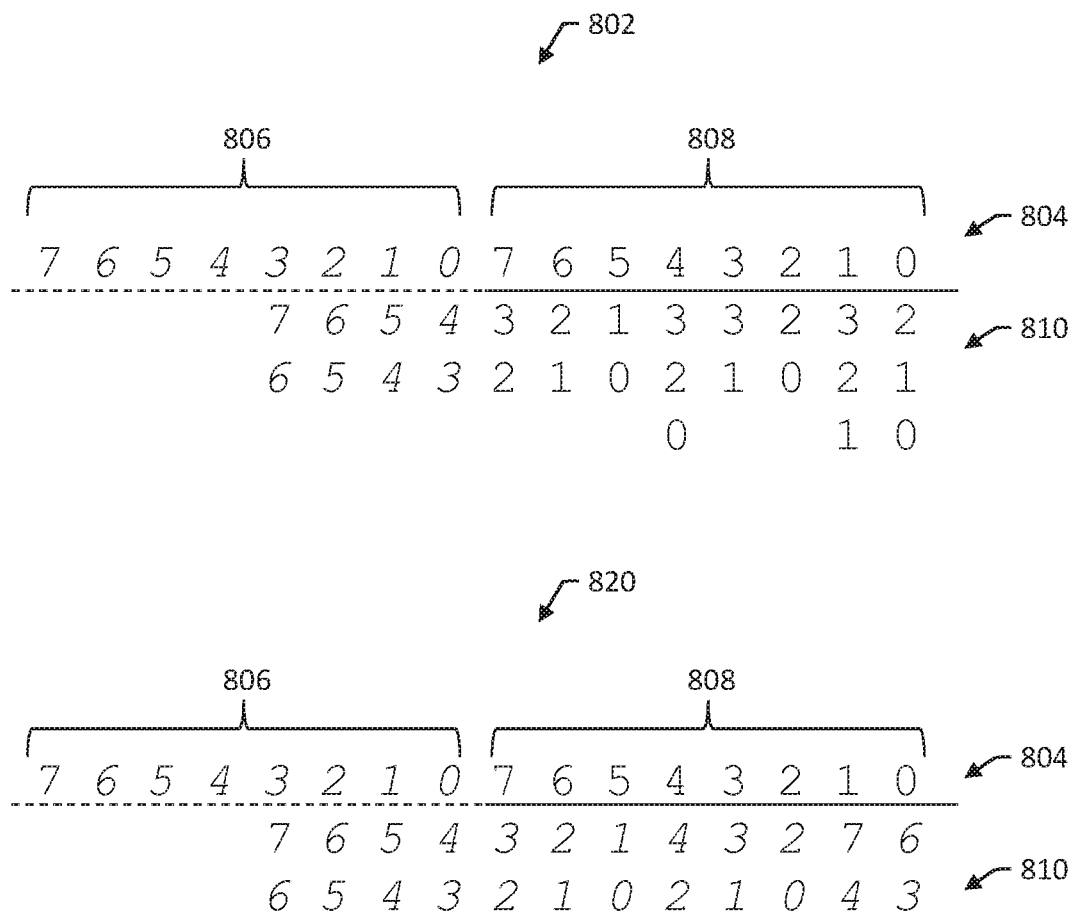
FIG. 8 illustrates an example of reducing the number of taps in a circuit that produces an 8-bit wide parallel PRBS4.

FIG. 8 illustrates an example of reducing the number of taps in a circuit that produces an 8-bit wide parallel PRBS4. FIGS. 3-6 illustrate how to generate a parallel PRBS4 by combining the terms of the flip-flops three to the left and two to the left (for the particular PRBS described.) However in the example, the previous 8 bit word consisted of 8 bits; not 4. The other 4 bits are also part of the same PRBS stream and bits 3, 2, 1, and 0 of the previous word are XORs of the upper bits just like they are in the to-be-created word. So bit 0 of the original word is an XOR of bits 4 and 3, bit 1 an XOR of bits 5 and 4, and so on.

FIG. 8 shows a first tap table 802 with the bit positions 804 of a previous word 806 (in italics) on the left and the bit positions 804 of the next word 808 shown on the right. The taps 810 for each bit position are listed below the bit position.

In the example illustrated in FIGS. 3-6, the taps for the next word 808 used only bit positions 3-0 of the previous word 806. However, for some bit positions of the next word 808, it is possible that substituting equivalent values from one or more of the other bit positions (i.e., bit positions 7-4) of the previous word 806 will result in a same bit being applied twice, allowing its cancellation and therefore reducing the number of taps.

For example, consider bit position 4 in the next word 808. The taps listed below bit position 4 are 3, 2, and 0. So the value for bit position 4 is determined as 3 XOR 2 XOR 0 from the previous word 806. Looking at the tap table 802, the value for bit position 0 of the previous word 806 can be formed as the XOR of bit positions 4 and 3. So an equivalent substitution for the value of bit position 0 is 4 XOR 3. Then, bit 4 can be determined as 3 XOR 2 XOR (4 XOR 3) which is 4 XOR 2. Bit 4 has now been created using the minimum number of taps, i.e., two taps. Thus, using the tap table, the taps for at least some of the bit positions can be omitted in favor of identified equivalent logical combinations of output values of other bit positions.

For bit 1 substitute every term so 3 XOR 2 XOR 1 becomes (7 XOR 6) XOR (6 XOR 5) XOR (5 XOR 4). The 6 and 5 can be cancelled leaving 7 XOR 4. The same exercise for bit 0 produces 6 XOR 3 so every XOR gate now has two taps. The resulting table 820 is shown in FIG. 8.

For some wide busses (e.g., 512,1024 bits) there are a lot of possible combinations of taps. A computer system can be programmed to search, using a trial-and-error method, for the tap combinations that reduce to two taps. For PRBS15 and PRBS31, many two and three tap XOR gates can be found for original tap sets of up to 12 taps. For example, bit 88 of a PRBS31 was originally made up of 14 taps, [2, 4, 5, 8, 10, 11, 14, 17, 20, 23, 24, 26, 29, 30]. After reduction it was found that taps 24 and 72 generated the same result, a factor of 7 reduction in size.

Figure 9:
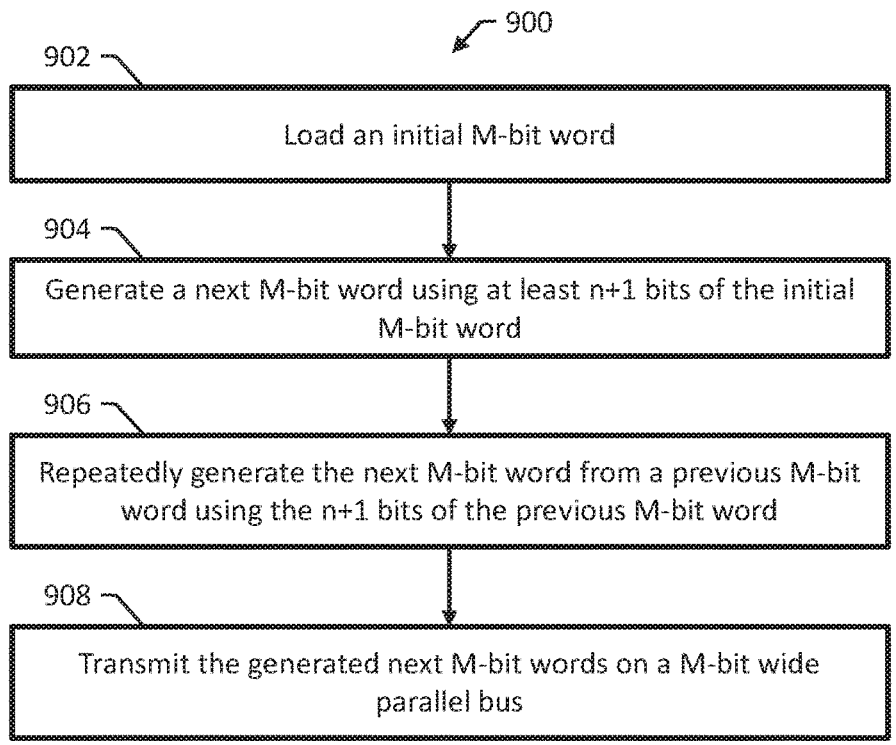
FIG. 9 is a flow diagram of an example method performed by a circuit for generating parallel PRBSs.

FIG. 9 is a flow diagram of an example method 900 performed by a circuit for generating M parallel PRBSs each comprising a $2^n-1$ sequence of pseudorandom bits. For example, the circuit specified by the tap table 820 of FIG. 8 can perform method 900 for a PRBS4 to generate 8 parallel PRBSs.

Method 900 includes loading into the circuit an initial M-bit word, the initial M-bit word includes M sequential bits selected from a pre-determined PRBS-n sequence (902). The initial M-bit word can be pre-determined using a logic table for the PRBS-n sequence, e.g., as illustrated in FIG. 3.

Method 900 includes generating, using logic gates of the circuit, a next M-bit word using at least n+1 of the M sequential bits of the initial M-bit word (904). For example, referring back to the tap table 820 of FIG. 8, the next word 808 is generated using taps to bit positions of 0, 1, 2, 3, 4, 6, and 7. In other words, n=4 and the next word 808 includes taps to 7 different bit positions.

In general, generating the next M-bit word using at least n+1 bits of the initial M-bit word can include using n sequential bits of the initial M-bit word and at least one more bit from the initial M-bit word in addition to the n sequential bits. In some cases, generating the next M-bit word may include using each of the M sequential bits of the initial M-bit word.

Method 900 includes repeatedly generating, using the logic gates of the circuit, the next M-bit word from a previous M-bit word using the at least n+1 of M sequential bits of the previous M-bit word, resulting in M parallel sequences of the PRBS-n sequence (906). Method 900 includes transmitting the generated next M-bit words on a M-bit wide parallel bus (908). In some examples, the circuit is implemented on an ASIC or FPGA, and transmitting the generated next M-bit words on a M-bit wide parallel bus includes transmitting the generated next M-bit words, via the M-bit wide parallel bus, to a data communications interface operating at 100 GHz or more.

Figure 10:
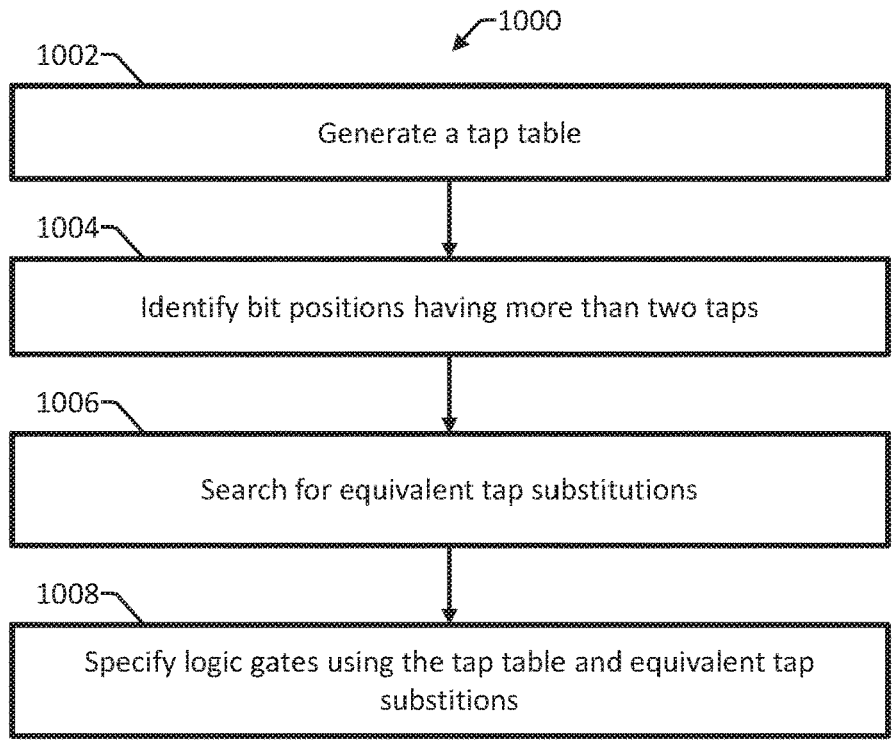
FIG. 10 is a flow diagram of an example method for designing a circuit for generating parallel PRBSs.

FIG. 10 is a flow diagram of an example method 1000 for designing a circuit for generating M parallel PRBSs each comprising a $2^n-1$ sequence of pseudorandom binary numbers. Method 1000 can be performed by a computer system comprising at least one processor and memory that is programmed to perform method 1000 or portions of method 1000.

Method 1000 includes generating a tap table specifying, for each bit position of M bits of a next M-bit word, a number of taps to n sequential bits of a previous M-bit word to create M parallel sequences of a PRBS-n sequence (1002). Method 1000 includes identifying bit positions each having more than two taps to the n sequential bits of the previous M-bit word (1004).

Method 1000 includes, for each bit position having more than two taps, searching, using at least one processor, for equivalent tap substitutions using at-least-one-more-bit from the previous M-bit word in addition to the n sequential bits (1006). For example, searching for equivalent tap substitutions can include, for at least a first bit position having more than two taps: identifying a first equivalent tap for one of the more than two taps using the tap table, the first equivalent tap tapping the at-least-one-more-bit from the previous M-bit word in addition to the n sequential bits; substituting the one of the more than two taps with the first equivalent tap; and determining that the first bit position can be logically reduced to two taps using the first equivalent tap.

Determining that the first bit position can be logically reduced to two taps using the first equivalent tap can include determining that at least two of the taps are to a same bit from the previous M-bit word. Method 1000 can include repeatedly substituting taps with equivalent taps and searching for substitutions that can be logically reduced to two taps, i.e., in a trial-and-error process to find substitutions.

Method 1000 includes specifying logic gates for the circuit using the tap table and at least one equivalent tap substitution found while searching for equivalent tap substitutions (1008). For example, method 1000 can include fabricating the circuit as an ASIC or FPGA.

FIGS. 11-14 illustrate optional refinements to method 1000 for reducing original tap sets from an original number of taps, e.g., 12 taps, down to a set of two different taps. Typically, method 1000 first expands and then reduces, and there can be a large number of taps, e.g., 30 or more taps, in the expanded set before reduction. As illustrated in FIGS. 11-14, reduction techniques can reduce the total number of reductions from trying every possible expansion and then reducing every resulting combination.

A maximal length PRBS created with two taps on a shift register can be generated in parallel from all the bits of the shift register. Consider, for example, a PBRS 23 which generates a non-repeating sequence of $2^n-1$ by tapping bit 18 and bit 23 of a shift register to produce the next term. For a parallel n bit word, bit n−1 is formed from bit (23-1) XORed with bit (18-1). Bit (n−2) is formed from bits (23-2) XORed with bit (18-2). Each term can be worked out by listing the terms 23 to the left with that 18 to the left and removing any pairs.

Figure 11:
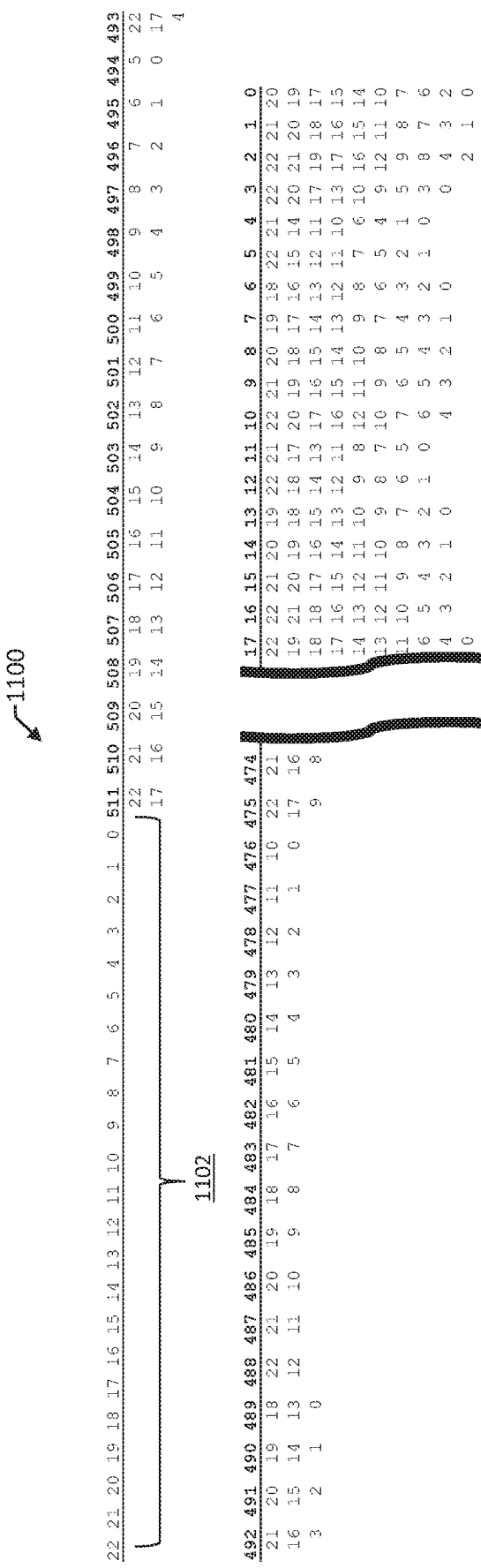
FIG. 11 illustrates a portion of a PRBS circuit as a tap diagram.

FIG. 11 illustrates a portion of such a PRBS circuit as a tap diagram as described further above. FIG. 11 shows the first 37 and last 17 tap sets 1100 that will generate the next 512 bits of a PRBS23 from the 23 terms of the current word 1102. There are a total of 3111 taps used.

If the current word always contains a correct 512 bit sequence then any bit will be the XOR of the bits 18 and 23 to the left. In addition, any bit XORed with the bit 18 to the left will equal the bit 23 to the left. And any bit XORed with the bit 23 to the left will equal the bit 18 to the left.

If we initialize a 512 bit word to a valid PRBS sequence, then all of the bits (or more than 23) of the current word can be used to create the bits of the next word, not just the last 23.

This can be useful, e.g., in reducing the number of taps. Term 493 of the next word is created using three taps from the current word: [22, 17, 4]. If we replace tap #4 with the two terms 23 and 18 bits to the left of current word bit #4 we get bits [27, 22]. Replacing this in the original equation gives [27, 22, 22, 17]. Bit 22 XORed with itself always produces 0 so both taps can be deleted and the taps for bit 493 become [27, 17] which is one tap less.

If this can be done for every tap set in the 512 terms of the next word, then the total number of taps can be reduced from 3111 to 1024. This results in considerable saving in routing and circuit complexity in the digital circuit used to create the PRBS.

Many of the tap sets can be reduced to two taps in this way (if they aren't two taps already) by expanding some of the taps to the "two taps 18 and 23 to the left" and removing all the matching pairs. However in many cases, especially for wide parallel busses, no combination of expanded taps will result in a reduction to 2 taps through removing pairs of matching taps.

Sometimes the tap set can be reduced to two taps if every tap is expanded, and then some of these expanded taps are expanded.

For example, term 471 is [5, 13, 18] If we expand any combination of the three taps the resulting tap set does not pair off to a 2 tap result. If we expand all the terms [[23, 28],[31,36],[36,41]]=[23,28,31,41] and try all 16 possible combinations of expanding some terms, it is found that expanding the first two [[41,46],[46,51], 31,41]=[31,41,41, 46,46,51] collapses to [31,51]. Other terms may have tap sets that require many iterations of this process to find a set that pairs off to two taps. This iterating process has to stop when the taps reach the last tap of the current word, but by then, there may be 40 or more taps present and testing every combination means testing $2^{40}$ possibilities (somewhere around a trillion ($10^{12}$) tests for one iteration).

For a two-tap PRBS generator (PRBS 23 has taps 18 & 23), we can label the smaller tap X and the larger tap Y and the distance between them D. We have already shown that any tap Q can be replaced with taps Q+X and Q+Y. Because we are working with XORs the reverse also holds. If we find two taps Q and Q+D apart (distance D) then they can be replaced with a tap X less than Q. For example, if taps 40 and 45 exist then they can be replaced with tap 40−X=40−18=22.

In fact, if we find two taps X (18) or X+D (23) apart they too can be reduced to one tap since, if the lower tap is Q and the other is Q+X, they always produce tap Q+Y. If the lower tap is Q and the other is Q+Y (=Q+X+D) then Q and Q+Y can be replaced with Q+X. Better still, if all three terms Q, Q+X and Q+Y are all present in the tap list, then they cancel out completely and all three can be removed.

This analysis can be applied to method 1000 to realize alternative methods of reducing the number of taps. A computer system can search for taps spaced by D or X or Y and substitute or delete the taps as appropriate.

This substitution method can be further expanded. Consider an original tap Q. It expands to [Q+X,Q+Y]. If Q+X and Q+Y are each expanded then we get [(Q+X)+X, (Q+X)+Y, (Q+Y)+X,(Q+Y)+Y] or in numbers for PRBS23, 0–>[18, 23] which expand to [18+18,18+23,23+18,23+23]. Q+X+Y appears twice (23+18)=(18+23) so they cancel leaving Q+2*X (Q+36) and Q+2*Y (Q+46). The distance between the two terms is (2*Y)−(2*X)=2 (Y−X)=2*D (10). So we have found another set of three taps that can be deleted if all three exist and reduced from two taps to one tap if two exist.

This exercise can be repeated and it can be shown that [Q, Q+4X,Q+4Y] or [Q,Q+8X,Q+8Y] also form sets of three taps capable of being reduced in number.

One further set has been shown to prove useful. If taps Q and Q+D exist then expanding both gives [[Q+X, Q+Y], [Q+D+X,Q+D+Y]]. Now D is the difference between X and Y therefore X+D=Y so if we substitute Y with X+D we get [[Q+X,Q+X+D],[Q+D+X,Q+D+X+D] which reduces to [Q+X,[Q+X+D]]. In other words, terms [Q,Q+D,Q+X, Q+X+2D] form a set of four which could also be removed if all 4 are present or allow substitution of one for the other three. In numbers 0 and 5 produce [[18,23],[23,28]] which leads to [18,28]. When there are 40 or so expanded terms, it is possible that two taps 2D apart may have corresponding other taps X less than the first and Y less than the second.

So there are a number of techniques that can be used to reduce the number of taps. In order to avoid large numbers of expanded terms needing every possible combination of expansions, a computer system can be programmed for expanding each tap in turn from the smallest to the largest, and then applying one or more of the techniques described above to determine whether the tap set can be reduced to 2.

The test of whether a tap set can be reduced, is to measure the distance between taps and if it is D,2D,4D 8D,X,2X, 4X,Y,2Y or 4Y then the reductions pertinent to that tap distance are applied to reduce the number of taps. When a substitution is performed—replacing two taps with another single tap—the computer system may determine that the distance between this new tap and the other existing taps meets the criteria for reduction, and further reductions become possible that were not possible before the introduction of the new substitute.

In some cases, expanding all taps at one level may not result in a reduction to two taps, but then re-expanding the expanded terms (perhaps many times over) does reduce. Performing the distance checks can be used, e.g., in determining when to stop trying at a particular expansion set.

Referring back to the 471 term from before [5,13,18], the algorithm proceeds as follows. Expand 5 [[23,28],13,18], then 5&13 [[23,28],[31,36],18] then all three [[23,28],[31, 36][36,41]=[23,28,31,41]. None of them reduce to two terms. In some cases, e.g., [13,18] and [31,41], the two terms are D(5) or 2D (10) apart, but they cannot be substituted as 13−X (13-18)=−5 and 31-2X (31-36)=−5 results in a negative number. However note that we have performed three sets of tests as opposed to $2^3=8$ the previous time.

If we now take the fully expanded set [23,28,31,41] and repeat the process [[41,46],28,31,41] fails to collapse to two taps but [[41,46],[46,51],31,41] does collapse to two taps [31,51]. Again we have performed two tests rather than up to $2^4=16$. As the number of terms increases, then for each iteration the number of test expansions required is N rather than $2^N$, e.g., 40 instead of a trillion.

Figure 12:
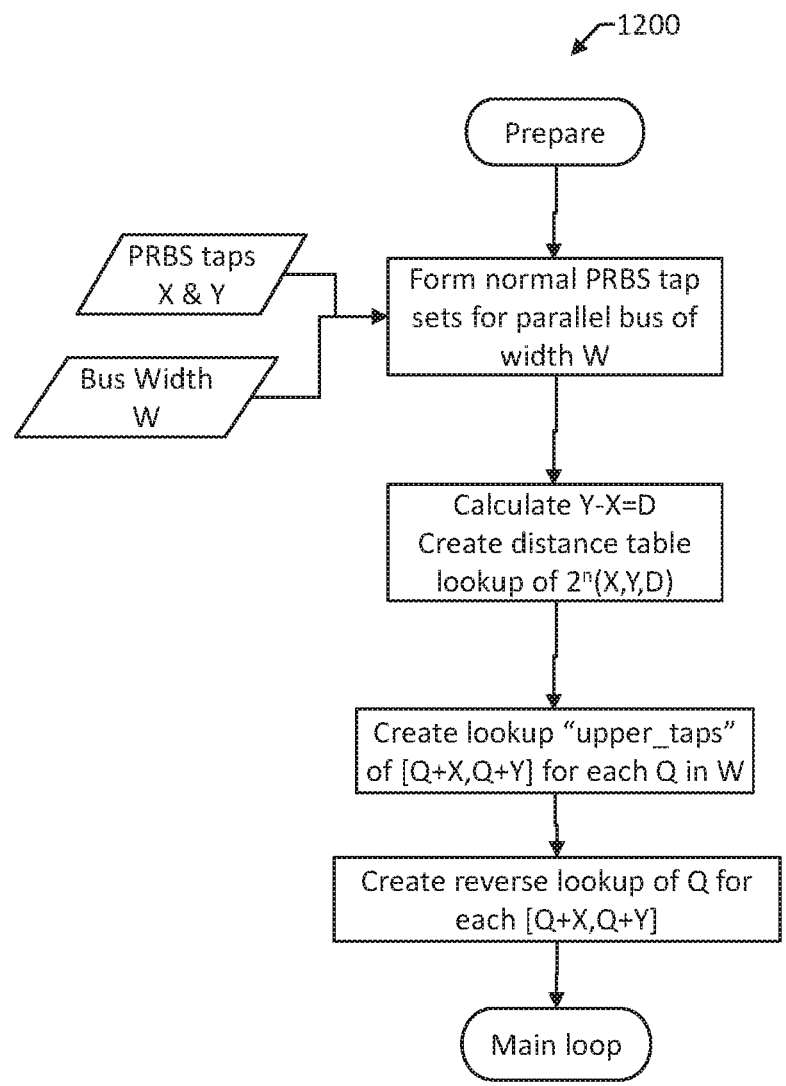
FIG. 12 is a flowchart of an example method for initializing a tap reduction program.
Figure 13:
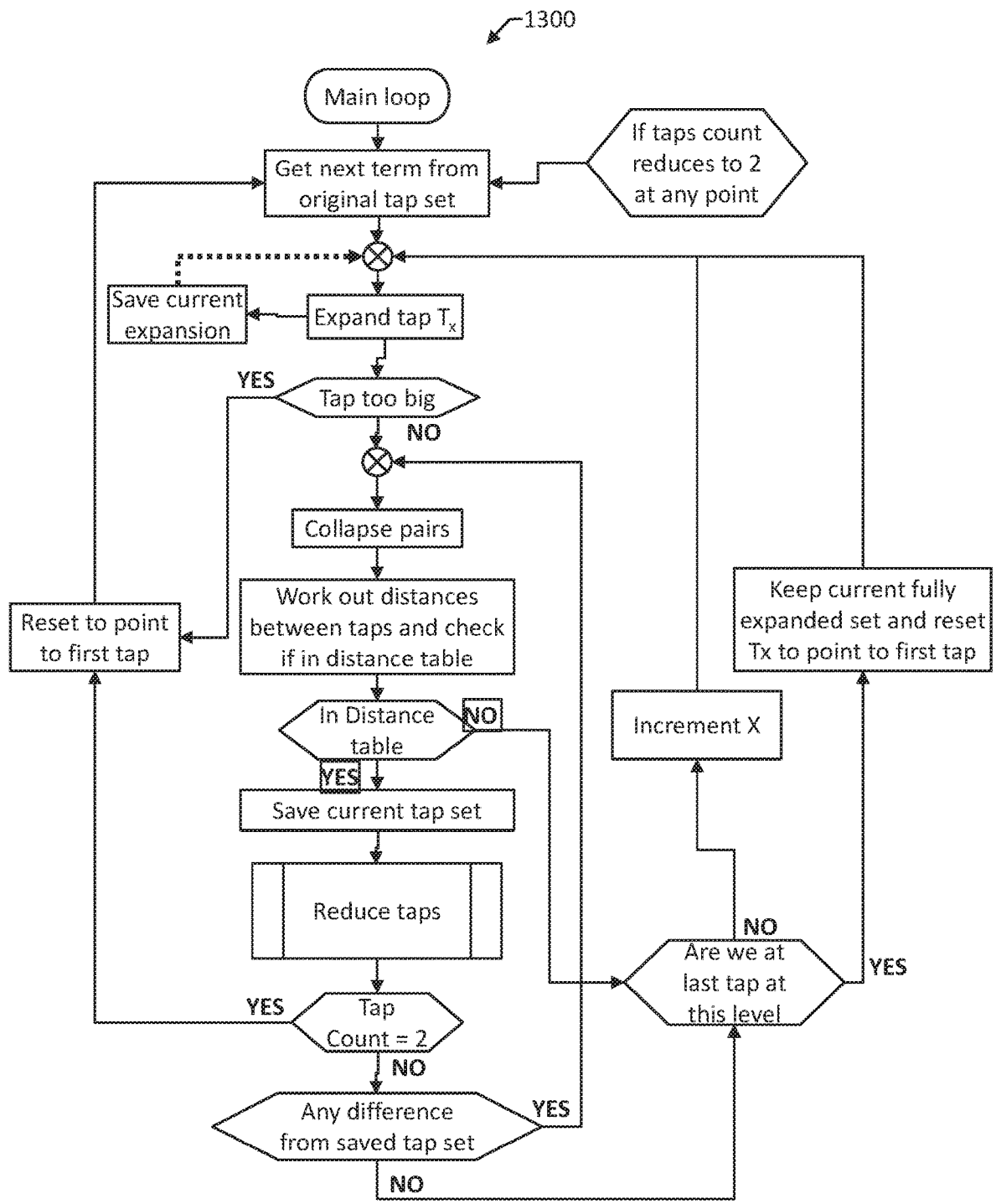
FIG. 13 is a flowchart of an example method for performing the main loop of the program.
Figure 14:
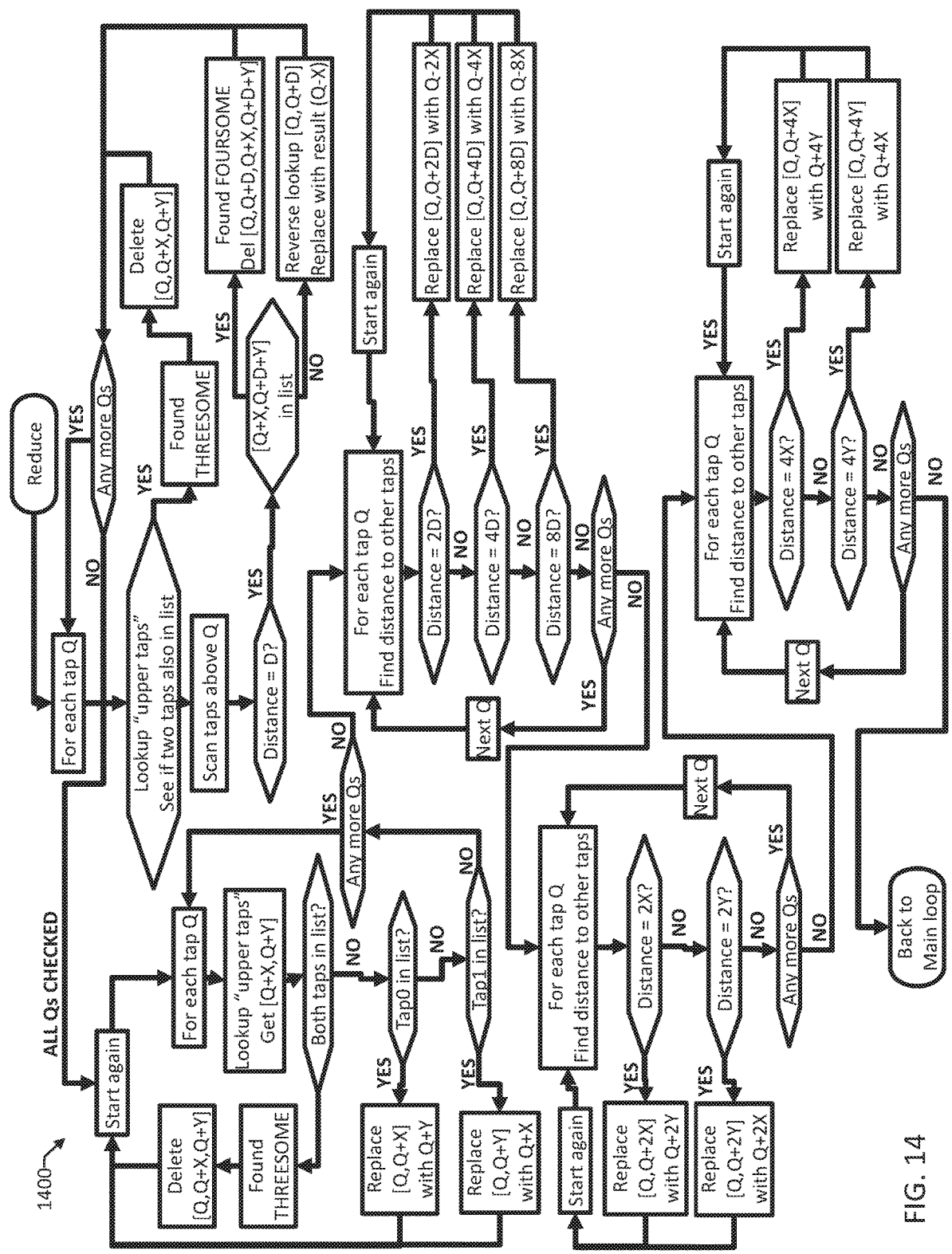
FIG. 14 is a flowchart of an example method for reducing the number of taps for a given bit position in a parallel PRBS word.

FIGS. 12-14 are flowcharts illustrating an example computer program incorporating these techniques for designing a parallel PRBS circuit. The illustrated steps represent one possible implementation. Performing the reductions in a different order can, and does, produce different results. For the 1024 and 2048 wide busses it may be necessary to apply the reduction techniques in different orders for the tap sets that have not been successfully reduced in number to two.

FIG. 12 is a flowchart of an example method 1200 for initializing the program. In method 1200, the terms for the PRBS and the width of the bus are input and the "normal" PRBS taps are worked out. A couple of lookup tables are created to speed things up within the program. One lists each pair of taps Q+X and Q+Y for each Q so that the taps can be accessed quickly. The other is a reverse-lookup table that quickly finds Q when fed with Q+X and Q+Y. Method 1200 can be implemented, e.g., using Python, which codes very succinctly with a look-up approach to programming.

FIG. 13 is a flowchart of an example method 1300 for performing the main loop of the program. Method 1300 includes determining an initial set of terms for the parallel PRBS, e.g., as described above with reference to FIGS. 3-7. Method 1300 then processes each tap set expanding taps in turn and iterating when all the expanded taps at one level do not produce a result. In general, method 1300 will stop iterating when method 1300 detects a two-tap result.

FIG. 14 is a flowchart of an example method 1400 for reducing the number of taps for a given bit position in a parallel PRBS word. Method 1400 includes performing the distance test and substitutions for each group of test types. First, method 1400 includes searching for threesomes and foursomes, by using a lookup technique on upper taps—rather than three spaced checks—to see if the three taps are in the list of taps. A threesome is a group of three taps that can be reduced to a single tap, and a foursome is a group of four taps that can be reduced to a single tap.

If the taps are in the list of taps, or if the distance between two taps is D, then one of four possible substitutions will take place. When any one of the substitutions succeeds the tests are repeated on the smaller set of taps to see if the substitutions caused other distance matches.

Once all the taps have been examined, the same process is repeated 4 times for each of four test types. First, method 1400 includes searching for taps X or Y apart (using a lookup) as sometimes a THREESOME can be created at the end of the previous cycle. Substitutions are performed and the remaining list rescanned in an identical manner to the previous scan loop. It then does the same thing for 2n*tap_distance and substitutes accordingly when a result is found. Then it performs distance checks and substitutes on 2X and 2Y followed by 4X and 4Y.

Outside this loop of method 1400, within the main loop of method 1300, the main loop will check a non-two-tap result of this reduction and if two taps exist a suitable distance apart then it will repeat the reduction process a number of times until no further improvement is detected.

The program illustrated in FIGS. 12-14 is one version of the tap reducer, and other tap reducing techniques—that are expansions of those shown—are implied. For example, in designing a 2048 wide bus reduction, reductions based upon 16*X 16*Y and 16*D may prove fruitful. In some examples, it may be possible to include reducing partial foursomes to a single tap (e.g [Q,Q+D,Q+Y+D]->[Q+X] or variations thereon. Other program steps, e.g., depending on the particular computing environment, may be used by performing selections from the same set of expansions and reductions.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method, performed by a circuit, for generating M parallel pseudorandom binary sequences (PRBSs) each comprising a pseudorandom sequence of $2^n-1$ bits, M and n being integers, the method comprising:
    loading into the circuit an initial M-bit word, the initial M-bit word comprising M sequential bits selected from a pre-determined PRBS-n sequence, wherein n>1 and M>n;
    generating, using a plurality of logic gates of the circuit, a next M-bit word using at least n+1 of the M sequential bits of the initial M-bit word;
    repeatedly generating, using the logic gates of the circuit, the next M-bit word from a previous M-bit word using the at least n+1 of M sequential bits of the previous M-bit word, resulting in M parallel sequences of the PRBS-n sequence; and
    transmitting the generated next M-bit words on an M-bit wide parallel bus.

2. The method of claim 1, wherein generating the next M-bit word using at least n+1 bits of the initial M-bit word comprises, for each bit of the next M-bit word, XORing a selected plurality of bits from the at least n+1 bits.

3. The method of claim 1, wherein generating the next M-bit word using at least n+1 bits of the initial M-bit word comprises using n sequential bits of the initial M-bit word and at least one more bit from the initial M-bit word in addition to the n sequential bits.

4. The method of claim 1, wherein generating the next M-bit word using at least n+1 bits of the initial M-bit word comprises using each of the M sequential bits of the initial M-bit word.

5. The method of claim 1, wherein repeatedly generating the next M-bit word from a previous M-bit word comprises generating the next M-bit word using a plurality of XOR gates of the circuit.

6. The method of claim 1, wherein the circuit comprises an application specific integrated circuit (ASIC) or field programmable gate array (FPGA), and wherein transmitting the generated next M-bit words on a M-bit wide parallel bus comprises transmitting the generated next M-bit words, via the M-bit wide parallel bus, to a data communications interface operating at 100 GHz or more.

7. The method of claim 1, wherein transmitting the generated next M-bit words on a M-bit wide parallel bus comprises transmitting the generated next M-bit words to a device-under-test (DUT), and wherein the method comprises receiving a response from the DUT and generating a test result based on the response from the DUT.

8. A circuit for generating M parallel pseudorandom binary sequences (PRBSs) each comprising a pseudorandom sequence of $2^n-1$ bits, M and n being integers, the circuit comprising:
    a pre-loading circuit configured for loading an initial M-bit word, the initial M-bit word comprising M sequential bits selected from a pre-determined PRBS-n sequence, wherein n>1 and M>n;
    a plurality of logic gates configured for generating a next M-bit word using at least n+1 of the M sequential bits of the initial M-bit word and then repeatedly generating the next M-bit word from a previous M-bit word using the at least n+1 of M sequential bits of the previous M-bit word, resulting in M parallel sequences of the PRBS-n sequence; and
    an output circuit configured for transmitting the generated next M-bit words on a M-bit wide parallel bus.

9. The circuit of claim 8, wherein generating the next M-bit word using at least n+1 bits of the initial M-bit word comprises, for each bit of the next M-bit word, XORing a selected plurality of bits from the at least n+1 bits.

10. The circuit of claim 8, wherein generating the next M-bit word using at least n+1 bits of the initial M-bit word comprises using n sequential bits of the initial M-bit word and at least one more bit from the initial M-bit word in addition to the n sequential bits.

11. The circuit of claim 8, wherein generating the next M-bit word using at least n+1 bits of the initial M-bit word comprises using each of the M sequential bits of the initial M-bit word.

12. The circuit of claim 8, wherein the logic gates comprise a series of flip-flops and a plurality of XOR gates.

13. The circuit of claim 8, wherein the circuit comprises an application specific integrated circuit (ASIC) or field programmable gate array (FPGA), and wherein transmitting the generated next M-bit words on a M-bit wide parallel bus comprises transmitting the generated next M-bit words, via the M-bit wide parallel bus, to a data communications interface operating at 100 GHz or more.

14. The circuit of claim 8, wherein transmitting the generated next M-bit words on a M-bit wide parallel bus comprises transmitting the generated next M-bit words to a device-under-test (DUT), and wherein the method comprises receiving a response from the DUT and generating a test result based on the response from the DUT.

15. A method for designing a circuit for generating M parallel pseudorandom binary sequences (PRBSs) each comprising a pseudorandom sequence of $2^n-1$ bits, the method comprising:
    generating a tap table specifying, for each bit position of M bits of a next M-bit word, a plurality of taps to n sequential bits of a previous M-bit word to create M parallel sequences of a PRBS-n sequence, wherein n>1 and M>n;
    identifying a plurality of bit positions each having more than two taps to the n sequential bits of the previous M-bit word;
    for each bit position having more than two taps, searching, using at least one processor, for equivalent tap substitutions using at least one more bit from the previous M-bit word in addition to the n sequential bits; and
    specifying a plurality of logic gates for the circuit using the tap table and at least one equivalent tap substitution found while searching for equivalent tap substitutions.

16. The method of claim 15, wherein searching for equivalent tap substitutions comprises, for at least a first bit position having more than two taps:
    identifying a first equivalent tap for one of the more than two taps using the tap table, the first equivalent tap tapping the at least one more bit from the previous M-bit word in addition to the n sequential bits;
    substituting the one of the more than two taps with the first equivalent tap; and determining that the first bit position can be logically reduced to two taps using the first equivalent tap.

17. The method of claim 16, wherein determining that the first bit position can be logically reduced to two taps using the first equivalent tap comprises determining that at least two of the taps are to a same bit from the previous M-bit word.

18. The method of claim 15, searching for equivalent tap substitutions comprises repeatedly substituting taps with equivalent taps and searching for substitutions that can be logically reduced to two taps.

19. The method of claim 15, wherein the logic gates comprise XOR gates, and wherein each tap comprises an input to an XOR gate.

20. The method of claim 15, comprising fabricating the circuit as an application specific integrated circuit (ASIC) or field programmable gate array (FPGA).

* * * * *